United States Patent [19]

Kern et al.

[11] Patent Number: 5,409,245

[45] Date of Patent: Apr. 25, 1995

[54] PLATFORM TYPE HAND CART WITH UNIVERSAL MOLDED BED

[75] Inventors: Alan R. Kern; Steven C. Decker; John A. LaFleur; Bruce S. Ferris, all of Richmond; George H. Hand, Midlothian, all of Va.; Jeffrey W. Rosania, Bloomsburg; John J. Refalo, III, Phillipsburg, both of N.J.

[73] Assignee: Rehrig International, Inc., Richmond, Va.

[21] Appl. No.: 91,559

[22] Filed: Jul. 15, 1993

[51] Int. Cl.6 .............................................. B62B 3/02
[52] U.S. Cl. .............................. 280/33.996; 280/47.34
[58] Field of Search ...................... 280/33.991, 33.992, 280/33.996, 33.997, 659, 47.34, 79.11

[56] References Cited

U.S. PATENT DOCUMENTS

| 2,414,277 | 1/1947 | Shepard, Jr. et al. | |
| 2,738,201 | 3/1956 | Spears | |
| 2,818,267 | 12/1957 | Watson | |
| 3,027,174 | 3/1962 | Garbarino | |
| 3,118,684 | 1/1964 | Kappen | 280/47.34 |
| 3,137,250 | 6/1964 | Hutchison | 280/42.34 |
| 3,813,111 | 5/1974 | Ruger | |
| 4,077,644 | 3/1978 | Raby et al. | 280/47.34 |
| 4,458,906 | 8/1981 | Lamson | 280/33.991 |

FOREIGN PATENT DOCUMENTS

| 0487147A1 | 5/1992 | European Pat. Off. | |
| 1323689 | 2/1962 | France | |
| 1428883 | 1/1966 | France | 280/33.991 |
| 434988 | 10/1967 | Switzerland | |
| 439993 | 12/1967 | Switzerland | |
| 1590951 | 6/1981 | United Kingdom | |
| 1595210 | 8/1981 | United Kingdom | |

Primary Examiner—Richard M. Camby
Attorney, Agent, or Firm—Bacon & Thomas

[57] ABSTRACT

A platform type hand cart includes a molded resin load carrying bed that is universally adaptable for both nesting and non-nesting cart configurations. The cart bed is slightly tapered from its rearward end to its forward end to enhance nestability, has a downwardly and forwardly sloping rear edge to further enhance nestability and includes various groups of mounting pads integrally molded into the underside of the bed for receiving fasteners used to secure wheel assemblies, a hinge assembly and a bumper assembly. Integrally molded reinforcing rod receiving pads may also be integrally molded into the underside of the bed for receiving structural reinforcing rods to stiffen the bed against deflection under load. By providing a single bed member with all of the various mounting pads required for nesting and non-nesting cart configurations, economies are achieved by permitting use of a single mold to produce a single bed adaptable for nesting and non-nesting cart applications. The molded bed is further provided with a protective rounded edge extending over at least a portion of the sides and the rear of the bed to protect feet and ankles of users of carts incorporating the bed member. The bed member includes mountings pads for assembling an elastomeric bumper to the forward end of the bed.

11 Claims, 4 Drawing Sheets

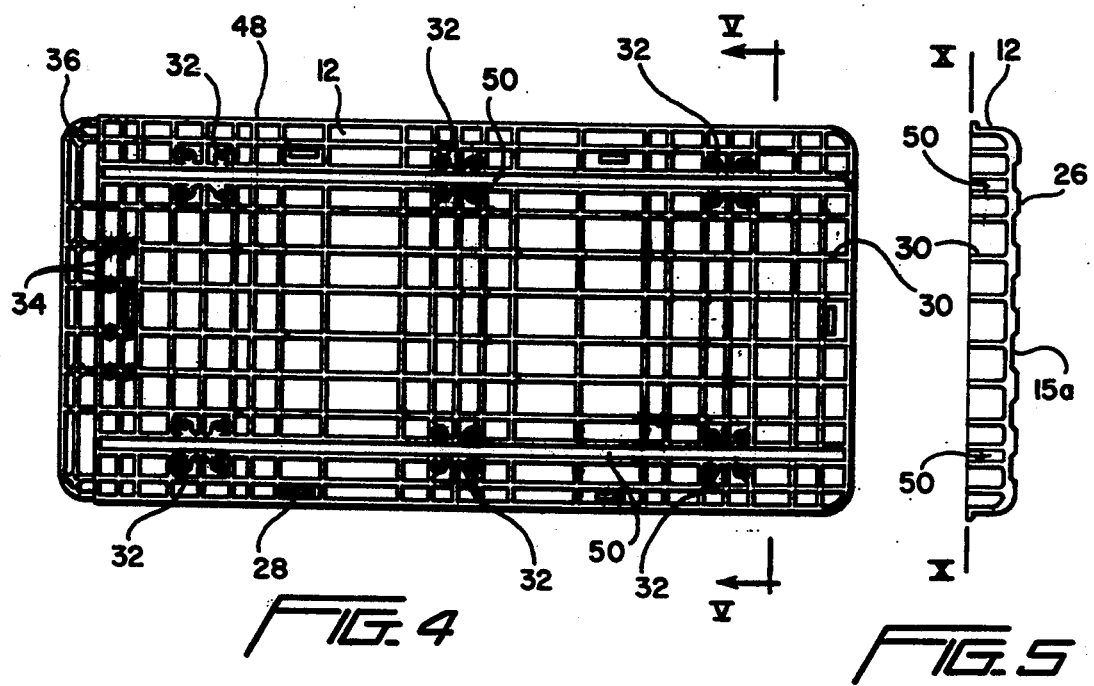
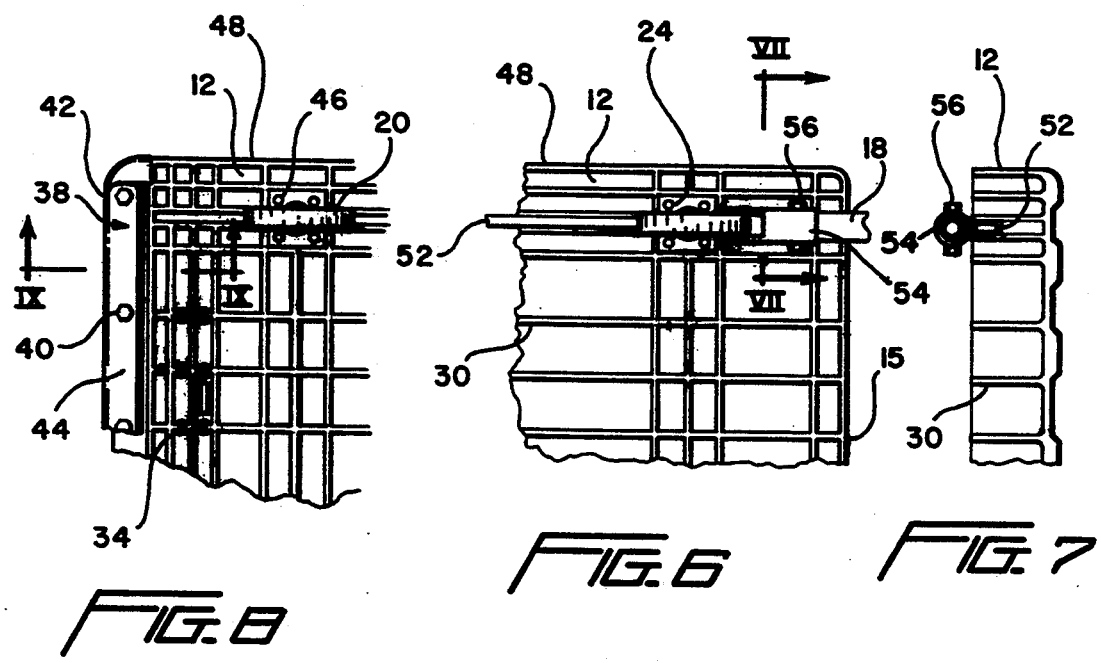
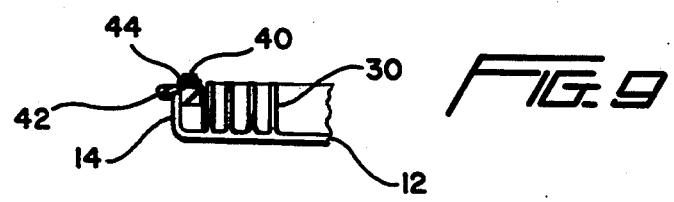

PLATFORM TYPE HAND CART WITH UNIVERSAL MOLDED BED

BACKGROUND OF THE INVENTION

This invention relates to platform or flat bed type hand carts for supporting and transporting articles.

Flat bed hand trucks are widely used for supporting and transporting various types of loads. This invention relates to such hand trucks that are useful for transporting merchandise and products by an operator, for example in a warehouse, retail establishment, business, or residential environment. In particular, the invention has particular application in a retail store environment where it is desired to provide a customer with a light weight yet sturdy flat bed hand cart for transporting merchandise to be purchased, and which possesses unique features that enhance efficiency and economy of manufacture while being user-friendly in the sense of minimizing risk of injury to the customer and the environment in which the cart is to be used.

Flat bed hand carts presently available for use in a business or retail environment are commonly made of painted metal and therefore are somewhat unwieldy and heavy. The painted metal rapidly becomes chipped, scraped and dented so that the appearance of the carts deteriorates rapidly after they are first placed into use and maintenance of the carts is expensive and time consuming. Carts with metal beds for supporting loads have welded joints that can break and rust over time, further increasing maintenance problems for metal carts.

Carts constructed in accordance with the prior art moreover do not include certain features for protecting a customer and the environment in which the cart is utilized. While this may not be a significant problem in certain environments, in a retail establishment, such as a flower shop, furniture store or a lumber yard, where it is desired to provide a flat bed hand cart for customer use, the lack of protective features can result in considerable damage to retail fixtures, appliances and products on display, and can pose a risk to the ankles of store patrons. Metal carts constructed in accordance with the prior art can and do inflict injury and damage to retail customers using the carts and to other customers that may be inadvertently struck by a cart or otherwise come into contact with the exterior edges of a cart that is left in an aisle or in the path of travel of a customer.

Flat bed hand carts constructed in accordance with prior art designs are quite large and bulky and often are not nestable together to enable storage of numerous carts in a small area. While nestable flat bed hand carts including plastic beds are known in the prior art, the manufacture of such carts involves utilizing different types of structural arrangements, including different types of load support beds, when making nestable and non-nestable carts. Often the beds must be tapered to enable nesting.

Thus, prior art technology has failed to provide a flat bed hand cart having a bed member made of light weight molded plastic material that is safe for retail customer use, and is universally adapted for both nesting and non-nesting cart configurations.

SUMMARY OF THE INVENTION

This invention provides a universal bed member for flat bed hand carts that is useable for both a nestable and a non-nestable cart configurations. The bed member is preferably injection molded using a suitable plastic resin that provides a tough yet light weight structure that possesses numerous structural features integrated into the structure during molding to enhance its function and utility.

The bed member constructed in accordance with the preferred embodiment of the invention is generally rectangular, and is provided with an upper surface that includes raised load bearing pads with textured surfaces to prevent shifting of loads placed on a cart assembly using the bed member. Water drain holes are integrally molded into the bed to prevent pooling of liquid on the surface of the bed, since flat bed carts of this type are commonly stored and/or used outside an enclosed retail establishment and thus are subjected to prevailing weather conditions.

The bed member moreover has a tapered upper surface that slopes downwardly from its rearward end towards its forward end to enhance nestability of a nestable cart using the bed member. However, the angle of slope is selected such that a non-nesting cart using the bed member is fully capable of supporting loads placed thereon without instability or slippage.

The bed member according to the present invention is preferably molded with a ribbed or honeycombed underside to reduce weight while maintaining rigidity. Another feature of the bed member constructed in accordance with the preferred embodiment is the provision on every bed member of fastener receiving mounting pads that are universal for both nestable and non-nestable cart configurations. Thus, each bed member may be provided with an array or group of fastener mounting pads for wheel assemblies and another array or group of mounting pads for a hinge assembly at the forward end of the bed member. Only one set of pads, however, is utilized in any given cart configuration. That is, for a non-nestable cart, the mounting pads for the wheel assemblies are utilized to mount wheels directly to the underside of the bed member. When the bed member is used for a nestable cart configuration, the bed member is mounted on a wheeled frame and is connected to the frame by a hinge arrangement at its forward end that enables the bed member to pivot upwardly at its rearward end about the hinge arrangement to permit nesting together of a series of carts in a manner similar to well known grocery shopping carts or airport luggage carts.

Each bed member constructed in accordance with the invention also preferably includes mounting pads or slots integrally molded in the underside of the bed member for receiving metal reinforcing rods that increase the rigidity of the bed member when used in a non-nesting configuration where the wheel assemblies are directly mounted to the underside of the bed member. Each bed member is also provided with integrally molded fastener mounting pads for receiving bumper mounting fasteners at the front end of the bed member so that a separate resilient bumper assembly may be secured to the bed member whether used in a nestable or non-nestable cart configuration.

The rearward end of the bed member preferably includes an integrally molded inclined surface that slopes downwardly in a forward direction to enhance nesting of the carts when a pair of carts are pushed together longitudinally. Each bed member is furthermore provided with an integrally molded protective rounded edge extending around at least a portion of the lower longitudinal sides of the bed member and the rear of the bed member to prevent ankle and foot injuries to persons who may inadvertently come into contact with the edge of the bed member.

Preferably, the bed member is constructed using a structural foam process in which an inert gas is directly injected into the plastic melt during injection and which expands during the molding process to provide an end product that has a tough, solid external skin and an internal rigid cellular structure. The resin material preferably is colored so that the pigment extends throughout the bed member, thereby avoiding the disadvantages inherent in painted metal carts that are prone to chipping, denting, rusting and pealing. The relatively light weight plastic material facilitates movement and maneuverability of carts using the bed members.

Efficiency of manufacture is achieved by utilizing a single bed member for both nesting and non-nesting cart configurations without the need to separately mold different bed configurations for different types of carts. By injection molding a single bed member configuration incorporating all of the fastener mounting pads and structural elements used in both nesting and non-nesting cart configurations, considerable savings are achieved since a single mold can be used to produce a single bed configuration for different cart models. Warehousing and handling costs are reduced since only a single bed configuration needs to be inventoried for various cart configurations.

DETAILED DESCRIPTION OF THE DRAWINGS

With reference to the appended drawings:

FIG. 4 is a bottom view of the bed member of the cart illustrated in FIG. 1;

FIG. 5 is a section view taken along line V—V in FIG. 4;

FIG. 6 shows one embodiment of the invention showing a wheel assembly attached to the bed member shown in FIG. 4;

FIG. 7 is a section view taken line VII—VII of FIG. 6;

FIG. 8 is a detailed view of an embodiment of a cart illustrating a wheel assembly and a front bumper member assembled to the bed member shown in FIG. 4;

FIG. 9 is a vertical cross section view taken along line IX—IX of FIG. 8;

DETAILED DESCRIPTION OF PREFERRED EMBODIMENTS

Figure 1:
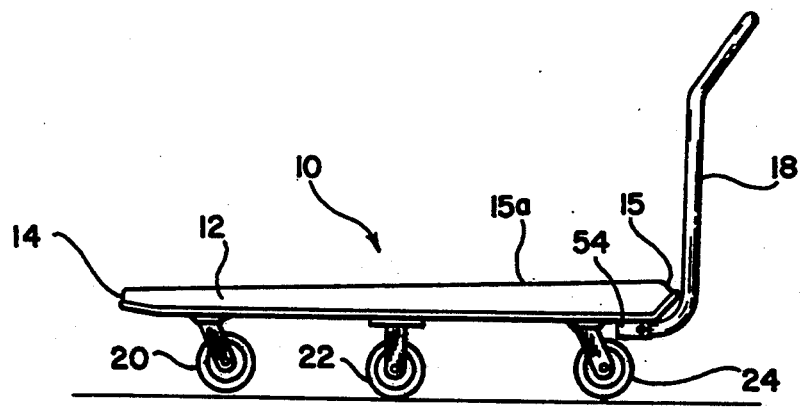
FIG. 1 shows a side elevation view of a platform type hand cart embodying the present invention.
Figure 2:
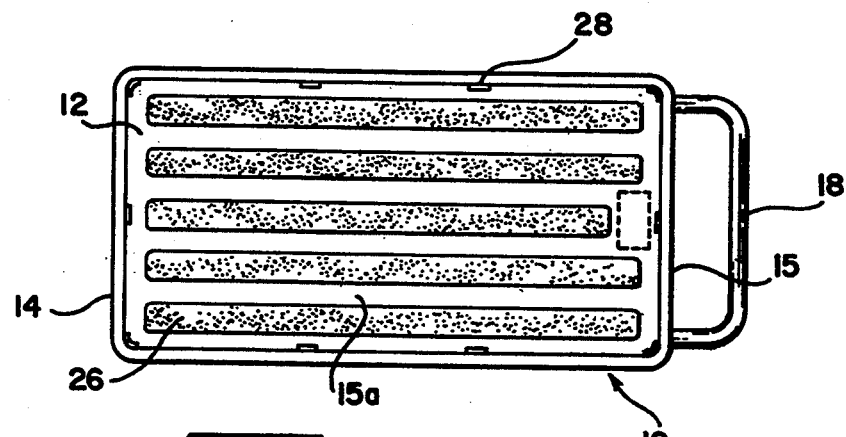
FIG. 2 is a top plan view of the cart shown in FIG. 1.
Figure 3:
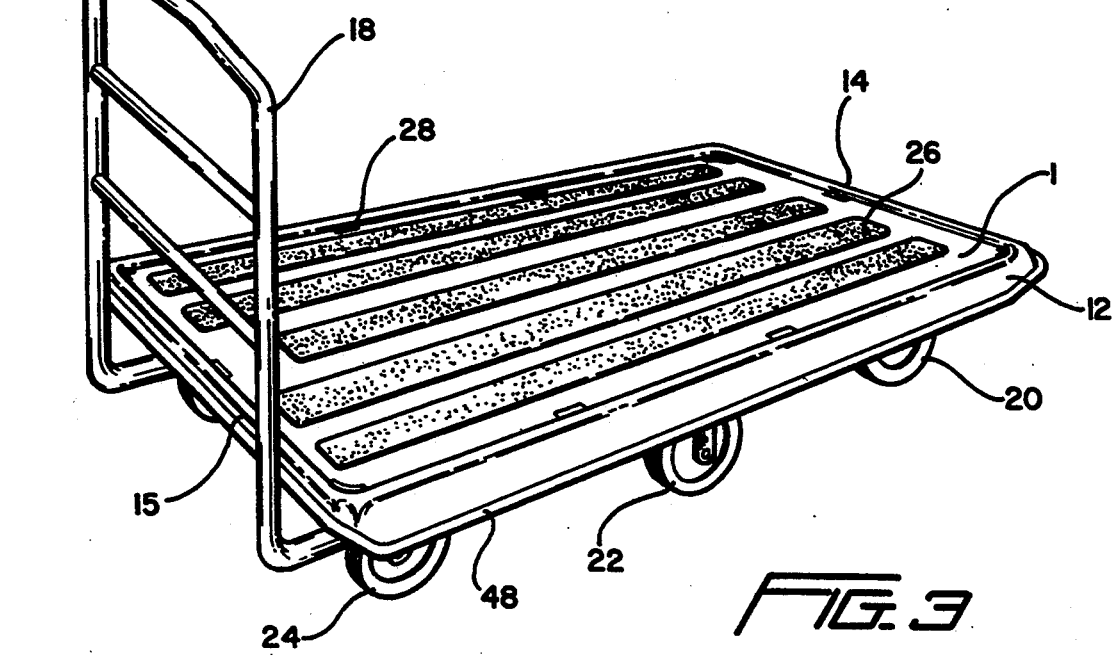
FIG. 3 is a perspective view of the cart shown in FIG. 1.

With reference with the appended drawings, a load carrying platform-type hand cart 10 is shown in FIGS. 1-3. Cart 10 includes a bed member 12 formed from a single piece injected molded structure having a forward end 14, a rearward end 15 and a generally flat top or upper surface 15a. The terms "forward" and "rearward" are only used herein for reference purposes since obviously such a cart could be pulled as well as pushed which would then reverse the rearward and forward ends, at least as perceived by the operator of the cart. Since such carts are typically pushed rather than pulled, however end 14 is referred to as the forward end for convenience, since that is the end that would normally face the direction in which the cart is advancing when pushed.

A handle member 18 is provided to manipulate the cart, and wheel assemblies 20, 22 and 24 are mounted in opposed pairs along each side of the bed member 12. In accordance with this embodiment, forward and rearward wheel assemblies 20, 24 could be swivel type wheels and would be raised somewhat from the support surface as compared with the central wheel assembly 22. This permits easy manipulation of the cart in accordance with known principles. While 6 wheel assemblies are illustrated in the preferred embodiment, it is to be understood that four wheel assemblies located towards the four corners of the bed 12 could be utilized, for example with a smaller cart size, in which case one set of wheel assemblies could incorporate a swivel type support system to facilitate maneuvering of the cart.

The upper side of the cart 15a, as shown in FIGS. 2 and 3, includes raised load carrying pads 26 that include a textured gripping surface on their upper sides.

Moisture draining apertures 28 extending completely through the bed member 12 are located at strategic locations around the periphery of the bed member to permit drainage of moisture that might be otherwise trapped on the upper surface of the bed member. The apertures 28, of course, could be located at any convenient or practical location on the bed 12.

The bed member 12 preferably is injection molded of a synthetic resin using a known structural foam process wherein inert gas is injected directly into the resin mix upon injection into the mold. The gas expands within the mold to create a molded structure having a tough solid surface skin but a foamed interior that is structurally rigid. Any suitable known injection moldable plastic resin may be utilized but preferably a high density polyethylene resin is used in accordance with the present invention.

A unique aspect of the preferred embodiment of the bed member 12 is the incorporation of various features that enable a single bed construction to be universally used for a nesting platform cart as well as a non-nestable platform cart.

More specifically, bed member 12 includes ribs 30 on its underside that do not extend substantially beyond a single plane indicated by line X—X in FIG. 5, which plane defines the bottom side of the bed member 12. Clearly, the underside of the bed member 12 comprises both ribs and surfaces that create an egg crate or honeycomb appearance to the underside of the bed member. However, if the bed member is laid flat on a surface with the load bearing pads 26 facing upwardly, the supporting surface would extend along the plane X—X relative to the bed member 12. Thus, the "bottom side" of the bed member 12 is intended to mean that side of the bed member that lies along the plane X—X as illustrated in FIG. 5.

As can be seen in FIG. 4, the underside of the bed member 12 includes a group of wheel assembly fastener mounting pads 32 that comprise integrally molded projections of plastic material constituting the bed member 12. These projections include suitable reinforcements and apertures that are arranged to receive fasteners for securing wheel assemblies 20, 22 and 24 to the underside of the bed member 12. In accordance with known techniques, fasteners for mounting the wheel assemblies may be directly threaded into the fastener mounting pads 32, or threaded metal inserts (not illustrated) may be pressed or threaded into the fastener mounting pads to enable bolt or screw type fasteners to be threaded thereinto for securing the wheel assemblies to the bed member 12.

As stated above, it is an object of the invention to create a single injection molded bed member 12 that is suitable for selected use in a nestable cart configuration or in a non-nestable configuration. The embodiment of the invention illustrated in FIGS. 1-3, for example, constitutes a non-nestable cart arrangement wherein wheel assemblies 20, 22 and 24 are directly mounted to the underside of the bed member 12 and a handle 18 is separately secured to the cart.

However, when it is desired to use the same bed member 12 in a nesting cart arrangement such as is illustrated in FIGS. 10-14, to be discussed below, the wheel assemblies will not be mounted directly to the bed member 12 but will be incorporated in a separate support frame that will be hingedly connected to the bed member 12 at its forward end.

Accordingly, to permit the use of a single injection molded bed member 12 for both types of applications, a separate set of hinge fastener receiving mounting pads is preferably incorporated into the bed member 12 on its underside at the forward end area of the bed member. It is to be understood that in any given cart configuration (i.e., nestable and non-nestable) either the wheel assembly mounting pads 32 will be utilized or the hinge assembly mounting pads 34 will be utilized, but both sets of mounting pads will not be used simultaneously in any cart configuration. By providing both sets of mounting pads, however, the bed member 12 is universally useable for making nesting as well as non-nesting carts.

Bed member 12 also preferably includes a third group of fastener mounting pads 36 for mounting a front bumper assembly 38 to the underside of the bed member 12 via fasteners 40 (see FIG. 8). The bumper assembly 38 includes a resilient elastomer leading edge 42 and a metal reinforcing strip 44 that extends along the length of the bumper. When assembled, the elastomer 42 is sandwiched between the metal reinforcing strip 44 and the plastic resin of the bed member 12, as shown in FIG. 9.

A wheel assembly 20 is shown attached to the bed member 12 in FIG. 8 using fasteners 46 that are threaded into the fastener receiving pads 32. It will be seen from FIG. 8 that the hinge fastener receiving pads 34 are not used in this cart configuration, which is a non-nestable cart, as illustrated in FIG. 1.

Other structural details of the bed member include an integrally molded rounded protective edge 48 preferably extending continuously along the lower sides of the bed member 12 and along the rear end 15 of the bed member (see FIG. 3), although such a protective edge could be molded so as to extend part way around the sides or along any portion of the peripheral rim of the bed 12. The purpose of the protective edge 48 is to protect ankles and heels of customers using carts constructed with bed members 12. It is particularly important to provide a rounded protective edge towards the rear of a cart where the handle is provided, since carts are often pulled by customers and the heels of customers tend to get caught beneath the rear edge of the cart, thereby resulting in various injuries to achilles tendons and feet of customers.

Thus, the combination of the bumper assembly 38 and the protective rounded edge 48 provides a user friendly cart that prevents damage or injury if the bed comes into contact with display merchandise, retail fixtures, and customers.

As can be seen in FIG. 1, the bed member 12 is molded so that its upper side is sloped relative to its bottom side, with the thicker portion of the bed member 12 being located towards the rear end 15 of the bed. As will be explained in more detail below, this tapered configuration of the bed member 12 enhances nestability of a nestable cart utilizing the bed member 12. However, when the bed member is not used in a nestable cart configuration, the tapered bed form does not interfere with normal operation and utilization of a cart.

As seen in FIG. 1, bed member 12 also includes a rear end 15 that slopes forwardly from the upper side of the bed towards the bottom of the bed. This sloping surface provides additional protection for the ankles and heels of customers that may be pulling the cart during its use and also enhances the nestability of carts when used in a nesting configuration.

The underside of the bed member 12 also may include a pair of longitudinally extending reinforcing rod receiving pads or slots 50 each adapted to receive a metal or structurally stiff reinforcing rod 52. The reinforcing rod receiving pads 50 extend between and intersect the wheel assembly fastener receiving pads 32 and, when assembled as illustrated in FIG. 6, the reinforcing rods 52 are disposed between the wheel assemblies 20, 22, 24 and the underside of the bed member 12. Appropriate end stops for the rods are molded into the bed to prevent longitudinal motion of the reinforcing rods.

The reinforcing rod receiving pads 50 may be configured in any suitable form, but preferably constitute extensions of the ribs 30, as illustrated in FIG. 5. The shape of the reinforcing rod may be any desired configuration, a square rod 52 being illustrated in accordance with the preferred embodiment. Another shape rod, such as a "T" shape, likewise could be utilized, in which case the reinforcing rod mounting pads would be appropriately configured to cooperate with and retain the reinforcing rod 52. At the rearward end of reinforcing rod 52, a handle attachment member or sleeve 54 is secured to the reinforcing rod for receiving a free end of the handle 18 which is secured thereto by a suitable fastener such as a bolt and lock nut 56. The handle 18, as shown in FIGS. 1 and 3, includes free ends that extend into holders 54 to thereby removably secure the handle to the cart.

Preferably, the reinforcing rod 52 and the handle holder 54 are preassembled before the reinforcing rod is inserted onto the reinforcing rod receiving pads 50 of the bed member 12. Mounting the wheel assemblies 20, 22 and 24 to the underside of the bed member 12 anchors the reinforcing rod members 52 in place on or against their respective pads and against the underside of the bed member 12. The reinforcing rods 52 strengthen the bed member 12 against bending deflection when loaded.

Figure 10:
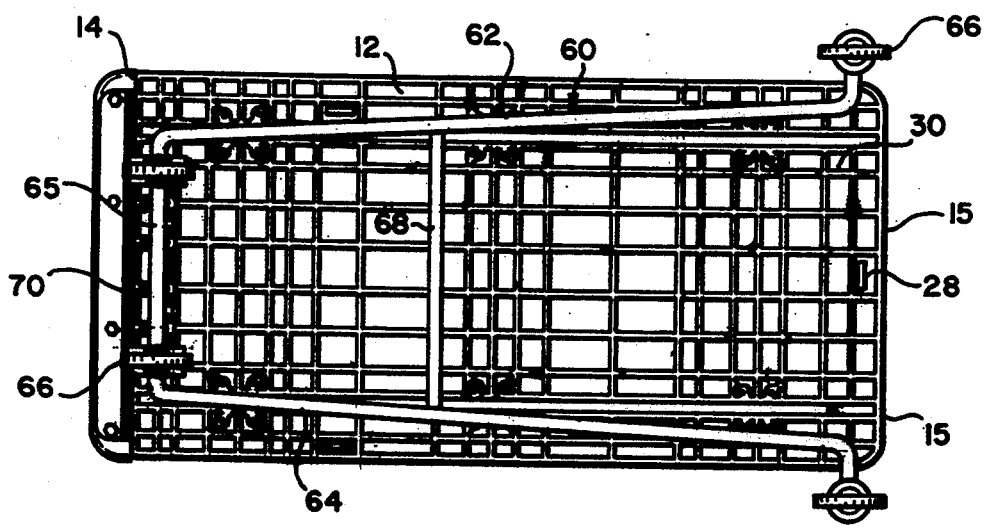
FIG. 10 is a bottom view of an alternate embodiment of a platform-hand cart constructed in accordance with the present invention utilizing the bed member shown in FIG. 4.
Figure 11:
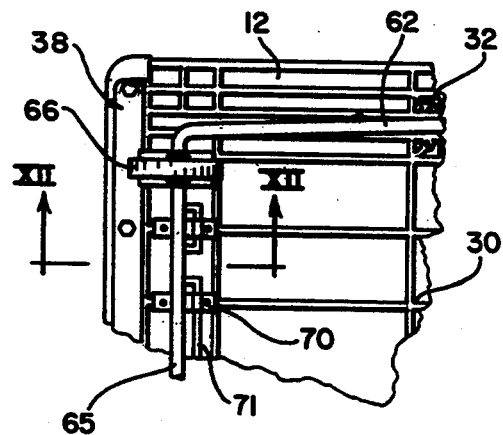
FIG. 11 is a detailed view showing the hinge detail incorporated in the cart shown in FIG. 10.
Figure 13:
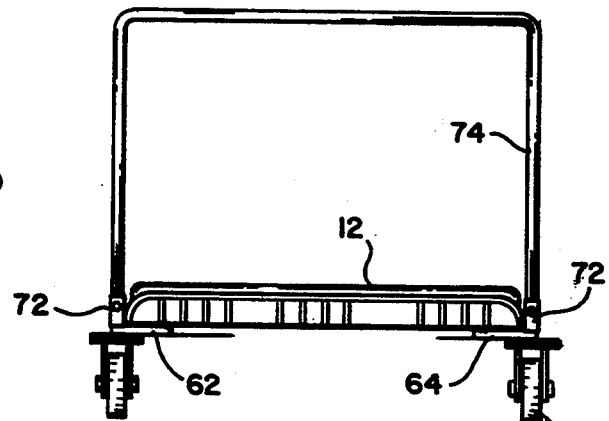
FIG. 13 is a rear elevation view of the cart shown in FIG. 10.
Figure 14:
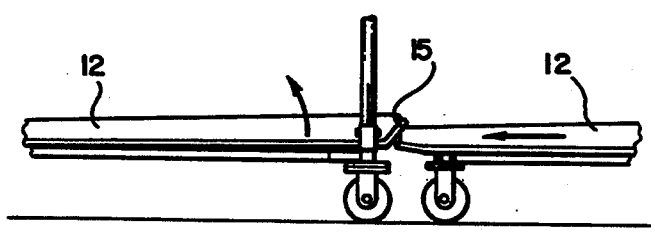
FIG. 14 is a schematic illustration of a pair of carts constructed in accordance with the embodiment shown in FIG. 10 as they approach a nested relationship.
Figure 15:
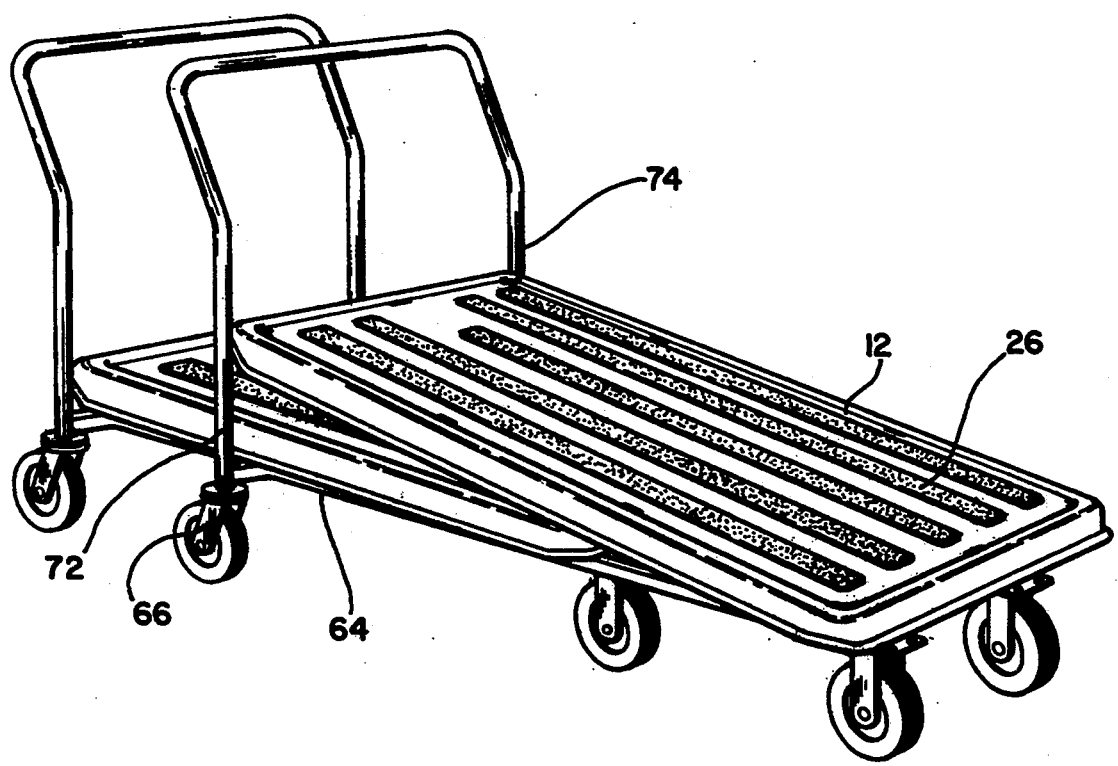
FIG. 15 shows a pair of nested carts constructed in accordance with the embodiment shown in FIG. 10.

FIGS. 10-14 illustrate the use of the bed member 12 in a nesting cart configuration. The bed member 12 shown in FIG. 10 is the same as the bed member 12 shown in FIG. 4. However, a wheeled support frame 60 includes side frame members 62, 64 extending longitudinally along the length of the cart and a transverse front frame member 66 connected to the side support members. The side and front frame members collectively form a framework to which front and rear wheel assemblies 66 are attached. FIG. 15 shows a perspective view of a pair of carts having this configuration in nested relationship.

Transverse reinforcing member 68 extending between and connecting the side frame members 62, 64 may be used to further strengthen the frame assembly 60. In accordance with this version of the cart, the bed member 12 is connected to the frame 60 by hinge elements 70 that are secured to the underside of the bed member 12 by fasteners secured to the hinge assembly fastener mounting pads 34. It will be noted that, in accordance with this version of the cart, the wheel assembly fastener mounting pads 32 are not utilized and do not interfere with the wheeled frame 60.

Figure 12:
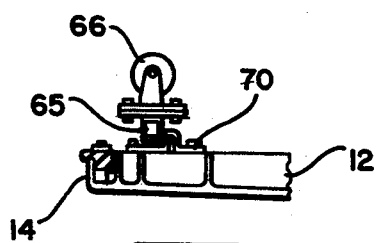
FIG. 12 is a section view taken along line XII—XII in FIG. 11.

The hinge element 70, as shown in FIG. 12, may simply comprise a bent loop of sheet metal cooperating with a pin or rod whereby the bed member 12 normally rests on the frame 60 and is secured against sideways or longitudinal motion relative to the frame by the hinge, but is pivotable upwardly from its rearward end about a pivot axis established by the hinge assembly 70 to enable a pair of carts to be nested together in the manner shown in FIG. 15.

It is to be noted that in the embodiment of the invention as shown in FIG. 10, that is the nestable cart arrangement, a reinforcing rod is not required and is not utilized in cooperation with the reinforcing rod mounting pads of the bed member 12.

It is to be understood that any suitable hinge arrangement 70 could be utilized with the invention. For example, while a rearwardly extending hinge pin 71 is shown cooperating with a bent member secured to bed member 12, a different hinge system could be utilized, or the pin 71 could be located directly between the front frame member 65 and the underside of the bed member 12. The only requirement is that the bed member 12 must be capable of pivoting upwardly about its front end when engaged from the rear by a similar cart that is maneuvered into the nesting position as shown in FIGS. 14 and 15. Preferably, the full load of the bed is supported by the frame members 62, 64, 66 when the cart is loaded during use.

The side frame elements 62, 64 may be connected to vertical handle securing sleeves 72 which receive the free ends of handle 74 used to maneuver the cart (see FIG. 13). Thus, the bed member 12 can freely pivot upwardly about the hinge assembly 70 without interference with the handle or the wheel assembly, while still being fully supported along its underside by the wheeled support frame 60.

As illustrated in FIG. 14, both the tapered configuration of the bed member 12 created by the sloping upper surface that is inclined towards the bottom of the bed member between its rearward and forward ends and the sloping rear end 15 of bed member 12 enhance the nestability of the nestable carts utilizing bed member 12. When nesting, the thinner forward end of bed member 12 is located at a lower position than the rear end 15 and engages the sloping rear end 15 of bed member 12 to displace the rear end 15 upwardly as the leading forward end of the bed 12 of the rear cart engages the rear end area of the bed 12 of the leading cart. A pair of the carts in their nested condition is illustrated in FIG. 15.

It will be understood that various modifications can be made to the specific embodiments illustrated herein, which are intended to be exemplary only. It is not intended to limit the invention beyond the scope of the claims appended hereto.

We claim:

1. A load carrying bed for a platform-type hand cart adapted for selective use in nestable and non-nestable carts, said bed comprising a single piece injection molded member having forward and rearward ends, a generally planar upper side, a bottom side comprising ribs not extending substantially beyond a single plane constituting the bottom of the member, an integrally molded rounded edge extending about a peripheral side potion of the bed member, a first group of integrally molded fastener mounting pads for receiving fasteners for mounting at least four wheel assemblies to the member, a second group of integrally molded fastener mounting pads located at the forward end area of the member for mounting at least one hinge element to the member to permit relative movement between the bed and the at least one hinge element when the bed is used in a nestable cart, said upper side being inclined relative to the bottom of the member from its rearward end to its forward end, and the rearward end of the member including an inclined portion sloping forwardly from an upper area to a bottom area of the member.

2. A bed for a platform hand cart as claimed in claim 1, including a plurality of drain holes extending from the upper side of the molded member to the bottom side thereof.

3. A bed for a platform hand cart as claimed in claim 1, including an integrally molded third group of fastener mounting pads at the forward end of the member for mounting a bumper assembly on the member.

4. A bed for a platform hand cart as claimed in claim 1, including at least two integrally molded reinforcing rod receiving pads in the bottom side of the member, each of said pads extending lengthwise of the member between the rearward and forward end of the member.

5. A bed for a platform hand cart as claimed in claim 4, wherein said first group of fastener mounting pads includes a first set of mounting pads spaced in a row lengthwise along one side of the member and a second set of mounting pads spaced in a row opposite the first set of mounting pads along the opposite side of the member, and wherein each reinforcing rod receiving pad extends between and intersects a row of fastener mounting pads.

6. A bed for a platform hand cart as claimed in claim 1, wherein said member is formed of structural foam.

7. A bed for a platform hand cart as claimed in claim 1, including raised load support pads on the surface of the upper side of the member, and wherein said pads include a textured gripping surface.

8. A platform type hand cart comprising:
a bed, said bed comprising a single piece injection molded member having forward and rearward ends, a generally planar upper side, a bottom side comprising ribs not extending substantially beyond a single plane constituting the bottom of the member, an integrally molded rounded edge extending at lease over a portion of the lower sides and a rear portion of the bed member, a first group of integrally molded fastener mounting pads for receiving fasteners for mounting at least four wheel assemblies to the member, a second group of integrally molded fastener mounting pads located adjacent the forward end of the member for mounting at least one hinge element to the member, said upper side being inclined relative to the bottom of the member from its rearward end to its forward end, and the rearward end of the member including an inclined portion sloping forwardly from the upper area to the lower side of the member;

at least four wheel assemblies;

removable fasteners mounted to said first group of fastener mounting pads and securing said wheel assemblies to said bed;

a handle for manipulating the cart secured to the cart at one end thereof.

9. A platform type hand cart as claimed in claim 8, including a plurality of drain holes extending from the upper side of the molded member to the bottom side thereof;

a plurality of raised load support pads on the surface of the upper side of the member, said pads including a textured gripping surface;

at least two integrally molded reinforcing rod receiving pads on the bottom side of the member, each of said reinforcing rod receiving pads extending lengthwise of the member between the rearward and forward end areas of the member;

said first group of fastener mounting pads including a first set of mounting pads spaced in a row lengthwise along one side of the member and a second set of mounting pads spaced in a row opposite the first set of mounting pads along the opposite side of the member, each reinforcing rod receiving pad extending between and intersecting a row of fastener mounting pads;

a metal reinforcing rod disposed between said wheel assemblies and engaging said reinforcing rod receiving pads;

an integrally molded third group of fastener mounting pads at the forward end of the member;

a front bumper assembly;

bumper fasteners secured to said third set of fastener mounting pads, said bumper fasteners securing said bumper assembly to said bed.

10. A nestable platform type hand cart comprising:

a rectangular bed comprising a single piece injection molded member having a forward and rearward end, a generally planar upper side, a bottom side comprising ribs not extending substantially beyond a single plane constituting the bottom of the member, an integrally molded rounded edge extending at least over a portion of the lower sides and at least a portion of the rear of the bed member, a first group of integrally molded fastener mounting pads for receiving fasteners for mounting at least four wheel assemblies to the member, a second group of integrally molded fastener mounting pads located at the forward end area of the member for mounting a hinge assembly the member, said upper side being inclined relative to the bottom of the member from its rearward end to its forward end, and the rearward end of the member including an inclined portion sloping forwardly from the upper area to the lower side of the member;

a wheeled support frame for supporting the bed;

said frame including generally longitudinally extending side support members and a transversely extending front support member connected to said side support members;

said hinge assembly including a first hinge portion secured to the front support member and a second hinge portion;

at least one hinge fastener secured to a fastener mounting pad of said second group of fastener mounting pads, said hinge fastener securing said second hinge portion to said bed; said first and second hinge portions being joined for pivotal movement, whereby said bed is pivotally mounted to said support frame for pivotal movement about said hinge.

11. A platform type truck as claimed in claim 10, including an integrally molded set of bumper fastener mounting pads at the forward end of the member; a bumper assembly; bumper fasteners secured to said bumper mounting pads and securing said bumper assembly to said bed.

* * * * *